United States Patent
Taniguchi et al.

(10) Patent No.: US 9,853,516 B2
(45) Date of Patent: Dec. 26, 2017

(54) ELECTRIC ROTATING MACHINE

(71) Applicant: DENSO CORPORATION, Kariya, Aichi-pref. (JP)

(72) Inventors: Makoto Taniguchi, Obu (JP); Jirou Hayashi, Ama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 311 days.

(21) Appl. No.: 14/829,383

(22) Filed: Aug. 18, 2015

(65) Prior Publication Data

US 2016/0065027 A1 Mar. 3, 2016

(30) Foreign Application Priority Data

Aug. 29, 2014 (JP) .................................. 2014-175645

(51) Int. Cl.
*H02K 5/00* (2006.01)
*H02K 5/04* (2006.01)
*B62D 5/04* (2006.01)
*H02K 5/15* (2006.01)
*H02K 7/08* (2006.01)
*H02K 5/10* (2006.01)
*H02K 11/33* (2016.01)

(52) U.S. Cl.
CPC ............. *H02K 5/04* (2013.01); *B62D 5/0424* (2013.01); *H02K 5/15* (2013.01); *H02K 7/083* (2013.01); *H02K 5/10* (2013.01); *H02K 11/33* (2016.01)

(58) Field of Classification Search
CPC H02K 5/04; H02K 5/15; H02K 7/083; H02K 11/33; H02K 5/10; H02K 5/225; H02K 11/05; B62D 5/0424
USPC .......... 310/71, 88–89, 91, 216.113, 216.127, 310/216.129, 216.133, 402, 405, 410, 413
See application file for complete search history.

(56) References Cited

U.S. PATENT DOCUMENTS

| 5,338,995 A | 8/1994 | Takada | |
|---|---|---|---|
| 6,268,669 B1 * | 7/2001 | Wakao | B62D 5/0406 180/443 |
| 2010/0133834 A1 | 6/2010 | Nimberger | |
| 2010/0148603 A1 * | 6/2010 | Jiang | B62D 5/0403 310/71 |
| 2012/0139380 A1 | 6/2012 | Taniguchi | |
| 2012/0223624 A1 * | 9/2012 | Yamashita | B62D 5/0406 310/68 R |
| 2013/0187517 A1 | 7/2013 | Asao et al. | |
| 2013/0300222 A1 * | 11/2013 | Nakano | H02K 11/0084 310/43 |
| 2014/0035407 A1 * | 2/2014 | Uryu | H02K 5/04 310/71 |

(Continued)

*Primary Examiner* — Thanh Lam
(74) *Attorney, Agent, or Firm* — Knobbe, Martens, Olson & Bear, LLP

(57) ABSTRACT

An electric rotating machine has a first end frame and a second end frame for firmly supporting a stator between them in an axial direction of the electric rotating machine. An electronic control portion is mounted to a rear side of the first end frame. Multiple through-holes are formed at a radial-outer periphery of the second end frame. Each of multiple through-bolts is inserted into the respective through-holes from a side of the second end frame and screwed into the first end frame, to thereby firmly connect the first and the second end frames to each other.

11 Claims, 9 Drawing Sheets

(56) References Cited

U.S. PATENT DOCUMENTS

| | | | |
|---|---|---|---|
| 2014/0339966 A1* | 11/2014 | Tomizawa | H02K 11/33 310/68 D |
| 2014/0346907 A1* | 11/2014 | Taniguchi | H02K 5/04 310/89 |
| 2015/0162798 A1* | 6/2015 | Ozawa | H02K 5/1735 310/43 |
| 2015/0333600 A1 | 11/2015 | Nakano et al. | |

* cited by examiner

ELECTRIC ROTATING MACHINE

CROSS REFERENCE TO RELATED APPLICATION

This application is based on Japanese Patent Application No. 2014-175645 filed on Aug. 29, 2014, the disclosure of which is incorporated herein by reference.

FIELD OF TECHNOLOGY

The present disclosure relates to an electric rotating machine for an electric power steering device of a vehicle.

BACKGROUND

An electric rotating machine is known in the art, which is used as a power source for an electric power steering device of a vehicle. In the electric rotating machine, an electric motor portion having a rotor and a stator and an electric control portion for controlling the electric motor portion are integrally formed.

Another electric rotating machine is known in the art, for example, as disclosed in Japanese Patent Publication No. 2013-153580. The electric rotating machine of this prior art has a simple structure, according to which a pair of end frames are coupled to each other by multiple through bolts and a stator is interposed between the end frames.

For example, as shown in FIG. 1 of the above prior art (JP 2013-153580) and also shown in FIG. 8 of the present application, an electric control portion is fixed to a first end frame (an upper-side end frame) of the electric rotating machine, while a second end frame (a lower-side end frame) of the electric rotating machine is fixed to an appropriate position on a side of a vehicle body.

When the electric rotating machine of this kind having the pair of end frames and the stator between the end frames is manufactured, a process for fixing the electric control portion to the first end frame and a process for inserting multiple through-bolts through the first and the second end frames are carried out on the same side of an axial end (an upper-side in the drawing) of the electric rotating machine, in view of achieving a high productivity. More exactly, the through-bolts are inserted through the first end frame at such positions, which are outside of a space for the electric control portion in a radial direction, and fastened to the second end frame.

In recent years, a diameter of the electric control portion is made to be almost equal to that of the stator of the electric motor portion. The positions for the through-bolts are restricted by the space for the electric control portion. In other words, it is difficult to locate the through-bolts at such positions closer to the stator in its radial direction. In such a structure, an axial force of the through-bolt cannot be effectively applied to the stator of the electric motor portion for firmly supporting the stator between both of the end frames.

When a function effect of the axial force of the through-bolts to the stator becomes lower, the first and the second end frames are likely to oscillate to each other. In particular, in the electric power steering device, a reaction force (a radial force) is applied to the electric rotating machine from a steering mechanism. Therefore, the first end frame, which is remote from the second end frame fixed to the vehicle body may be largely oscillated and the electric control portion fixed to the first end frame may be bent.

When the axial force of the through-bolts is made larger in order to suppress the oscillation of the end frame of the electric rotating machine, the first and/or the second end frames maybe bent in the axial direction, that is, in a direction closer to each other unless the axial force is properly applied to the stator provided between the first and the second end frames. As a result, the electric control portion may be bent.

As above, it is a problem in the electric rotating machine in the prior art that a mechanical stress may be applied to the electric control portion, which is mounted to the first end frame.

SUMMARY OF THE DISCLOSURE

The present disclosure is made in view of the above problem. It is an object of the present disclosure to provide an electric rotating machine, according to which a stator is firmly supported between a first and a second end frames coupled to each other by multiple through-bolts and a mechanical stress to be applied to an electric control portion mounted to the first end frame can be reduced.

According to a feature of the present disclosure, an electric rotating machine is applied to an electric power steering device of a vehicle and mounted to a fixing portion of the vehicle.

The electric rotating machine has an electric motor portion, which is composed of;

i) a stator having a cylindrical stator core and a winding wound on the stator core or a supporting member for fixedly supporting the stator at an inside of the supporting member; and ii) a rotor rotatably provided inside of the stator.

The electric rotating machine has a control portion for controlling power supply to the winding of the electric motor portion.

The electric rotating machine further has;

a first end frame provided at a first axial end of the stator, wherein the control portion is fixed to a rear side of the first end frame opposite to the stator;

a second end frame provided at a second axial end of the stator and fixed to the fixing portion of the vehicle, wherein the first end frame and the second end frame firmly hold between them the stator or the supporting member in an axial direction of the electric rotating machine;

multiple through-holes formed at a radial-outer periphery of the second end frame; and multiple through-bolts, each of which is inserted through each through-hole and screwed into the first end frame in order to firmly connect the first and the second end frames to each other in order to firmly hold the stator between them.

According to the above feature, the through-bolts are assembled to the first and the second end frames, which hold the stator in the axial direction between them, from a side of the second end frame. According to such a structure, locations of the through-bolts are not restricted by a space for mounting the control portion to the first end frame. In other words, it is possible to locate the through-bolts at positions closer to the stator in a radial direction of the electric rotating machine.

According to the electric rotating machine, it is possible to effectively apply an axial force of the through-bolts to the stator (or the supporting member fixedly supporting the stator) and thereby to firmly connect the first and the second end frames to each other, so that the stator (or the supporting member) is firmly supported between the first and the second end frames.

As a result, even when a radial force is applied to the electric rotating machine from a steering mechanism, it is possible to prevent vibration of the first end frame. In addition, it is possible to prevent bending of the first and/or the second end frames in the axial direction of the electric rotating machine (that is, in a direction closer to each other) by the axial force of the through-bolts.

Accordingly, in the electric rotating machine of the present disclosure, it is possible to prevent a possible bending of the control portion, which is mounted to the first end frame, and to suppress any mechanical stress to be applied to the control portion.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
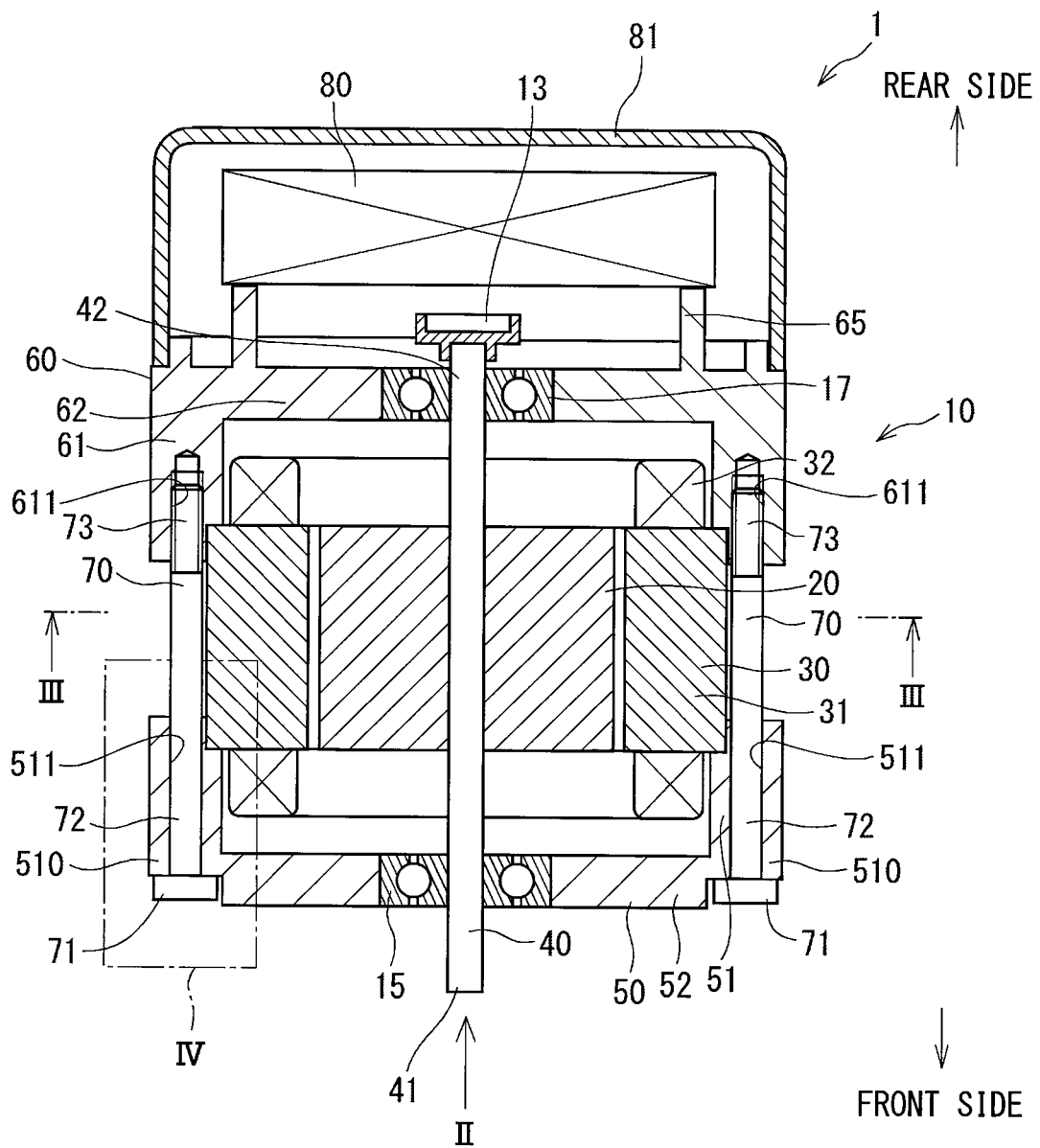
FIG. 1 is a schematic cross sectional view showing an electric rotating machine according to a first embodiment of the present disclosure.

The present disclosure will be explained hereinafter by way of multiple embodiments with reference to the drawings. The same reference numerals are given to the same or similar structure and/or portion in order to avoid repeated explanation.

First Embodiment

An electric rotating machine 1 of a first embodiment of the present disclosure is shown in FIGS. 1 to 4 and 9.

Figure 9:
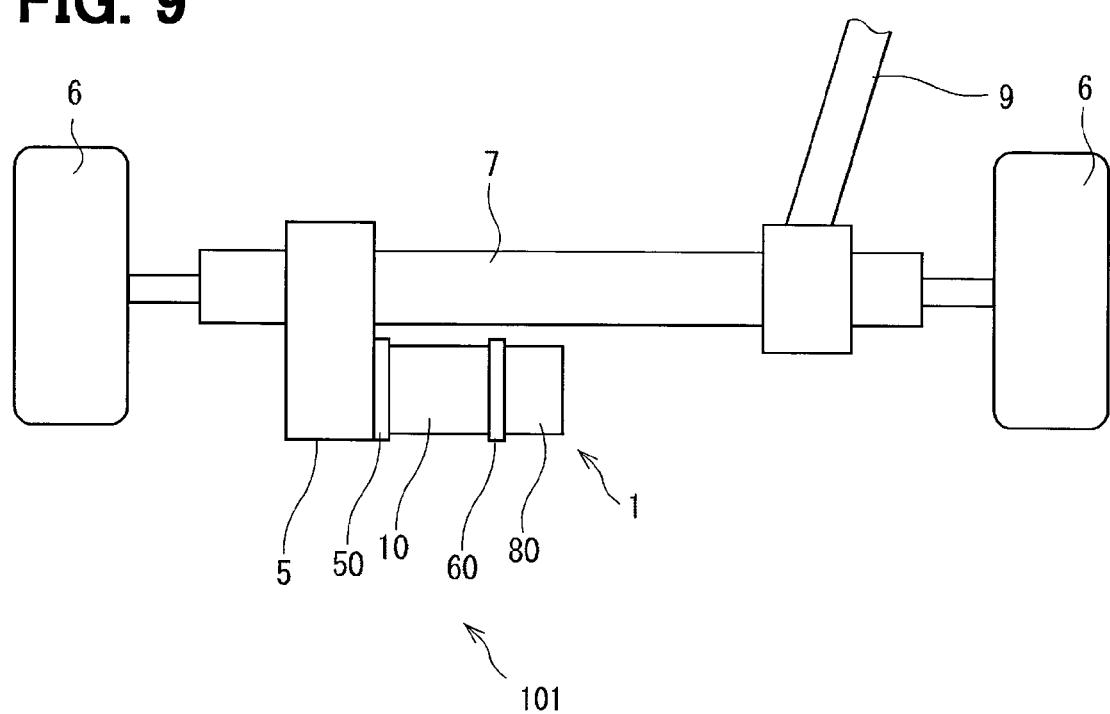
FIG. 9 is a schematic view showing an electric power steering device for a vehicle, to which the electric rotating machine of the present disclosure is applied.

As shown in FIG. 9, the electric rotating machine 1 is used as a power source for an electric power steering device 101 for assisting a steering operation of a vehicle by a vehicle driver. The electric power steering device 101 is composed of the electric rotating machine 1 for generating a steering-assist torque, a speed reduction device 5 for reducing rotational speed of the electric rotating machine 1 and transmitting the rotation of the electric rotating machine 1 to a steering mechanism and so on. The electric rotating machine 1 is fixed to the speed reduction device 5, which is also referred to as a fixing portion of the vehicle.

In FIG. 9, the speed reduction device 5 of the electric power steering device 101 is connected to a rack shaft 7, to each end of which a steering wheel 6 is respectively connected. The speed reduction device 5 may be connected to any other portion, for example, a steering shaft 9.

A structure of the electric rotating machine 1 will be explained with reference to FIGS. 1 to 3.

The electric rotating machine 1 is a rotating machine, which is composed of an electric motor portion 10 and an electric control portion 80 for controlling electric power supply to the electric motor portion 10. The electric motor portion 10 (hereinafter, the motor portion 10) and the electric control portion 80 (hereinafter, the control portion 80) are integrally assembled to each other.

In the following explanation, an axial direction of the motor portion 10 is simply referred to as "an axial direction". A radial direction of the motor portion 10 is likewise referred to as "a radial direction", and a circumferential direction of the motor portion 10 is further referred to as "a circumferential direction". In addition, an axial end of the electric rotating machine 1, which is connected to the speed reduction device 5, is referred to as "a front side". An opposite axial end of the electric rotating machine 1 is referred to as "a rear side".

The motor portion 10 is composed of, for example, a three-phase brushless motor, which has a rotor 20, a stator 30, a shaft 40, a front-side end frame 50 (which is also referred to as a second end frame), a rear-side end frame 60 (which is also referred to as a first end frame), multiple through-bolts 70 and so on.

Figure 3:
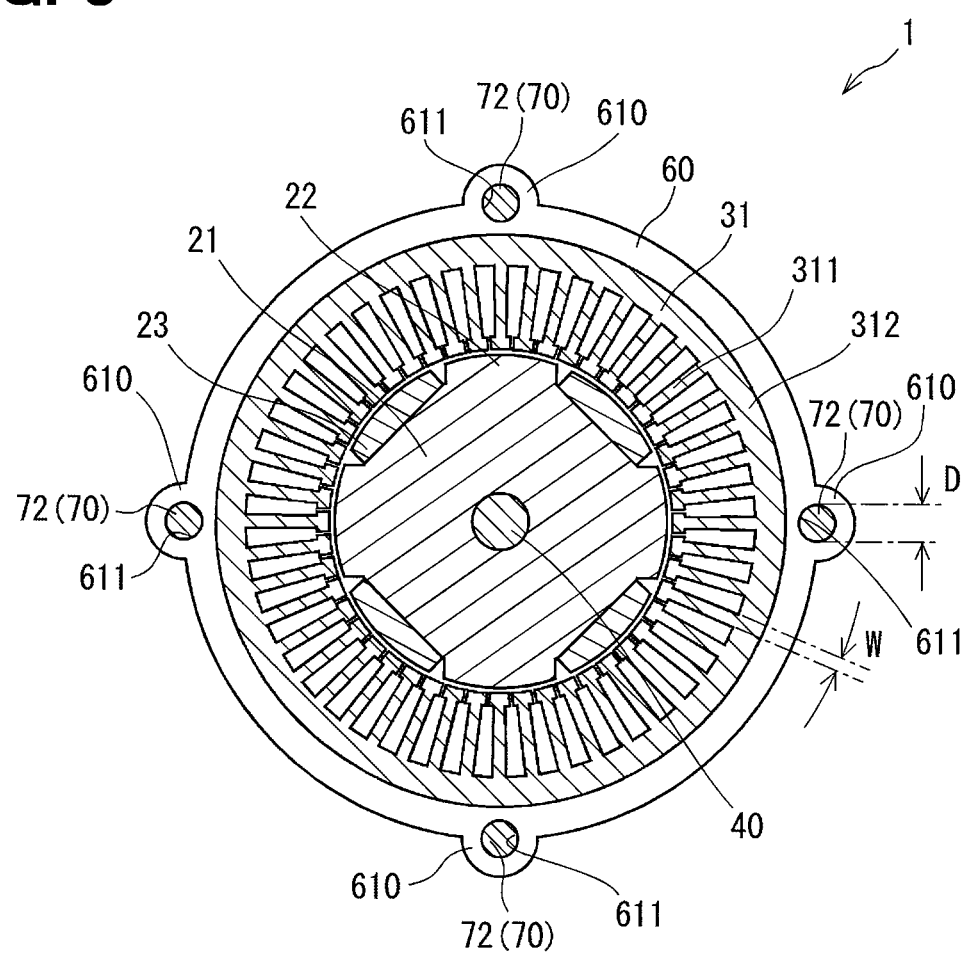
FIG. 3 is a schematic cross sectional view showing the electric rotating machine, taken along a line in FIG. 1.

The rotor 20 is a rotor of a permanent-magnet type, which has a rotor core 21, multiple projected poles 22, multiple magnetic poles 23 and so on, as shown in FIG. 3. The rotor core 21 and the projected poles 22 are made of soft magnetic material. The shaft 40, which works as a rotating shaft, is inserted through and fixed to a center through-hole of the rotor core 21. Each of the magnetic poles 23, which are made of permanent magnets, is arranged in a circumferential direction of the rotor 20 and between neighboring projected poles 22. Each of the magnetic poles 23 is magnetized in a radial direction of the rotor 20 so that the same magnetic polarity appears at each radial-outside portion. Each of the projected poles 22 is magnetized in the radial direction so that the same magnetic polarity opposite to that of the magnetic poles 23 appears at each radial-outside portion of the projected pole 22. In the present embodiment, a number of pairs of magnetic poles (N-pole and S-pole) for the rotor 20 is four.

In FIG. 3, a winding 32 of the stator 30 is omitted for the sake of simplification.

The stator 30 is composed of a stator core 31, which is formed in a cylindrical shape and arranged at an outer periphery of the rotor 20 in its radial direction, and the winding 32 of three-phase coils. In the present embodiment, the winding 32 is wound on the stator core 31 by a full-pitch distributed-winding method. The full-pitch distributed-winding method is a winding method, which is a combination of a distributed-winding method and a full-pitch winding method. The winding 32 is formed by wires, for example, segment conductor type wires.

The stator core 31 is composed of multiple teeth 311 (tooth portions), each forward end of which is opposed to the rotor 20 in the radial direction, and a yoke portion 312 magnetically connecting the teeth 311 with one another at a radial-outward side of the stator core 31. In the present embodiment, sixty (60) tooth portions 311 are arranged in the circumferential direction of the stator core 31 at equal intervals. More exactly, twelve tooth portions 311 form one pair of magnetic poles. A width "W" of each tooth portion 311 in the circumferential direction (that is, the width "W" at a root of each tooth portion 311) is smaller than a diameter "D" of a shaft portion 72 of the through-bolt 70, as shown in FIG. 3 (explained below).

The shaft 40 passes through a rotational center (the center through-hole) of the rotor 20 and is rotated together with the rotor 20. An output member (not shown) is coupled to a front-side axial end 41 (a second axial end) of the shaft 40. The output member is connected to the speed reduction device 5. A magnet 13 for detecting a rotational angle of the shaft 40 is provided at a rear-side axial end 42 (a first axial end) of the shaft 40.

The front-side end frame 50 is formed in a cylindrical shape having a front-side cylindrical wall 51, into which a front-side end of the stator core 31 is fitted by a spigot joint, and a front-side bottom wall 52, which closes a front-side end of the cylindrical wall 51. The front-side end frame 50 rotatably supports the front-side axial end 41 (the second axial end) of the shaft 40 via a bearing 15 provided at a center of the front-side bottom wall 52.

The front-side cylindrical wall 51 of the front-side end frame 50 has multiple bolt-insertion portions 510 (four bolt-insertion portions 510 in the present embodiment). Each of the bolt-insertion portions 510 is formed at a radial-outward periphery of the front-side cylindrical wall 51 in such a way that a part of the bolt-insertion portion 510 is outwardly projected therefrom in the radial direction, as shown in FIG. 2. A through-hole 511 extending in the axial direction is formed in each of the bolt-insertion portions 510.

Figure 2:
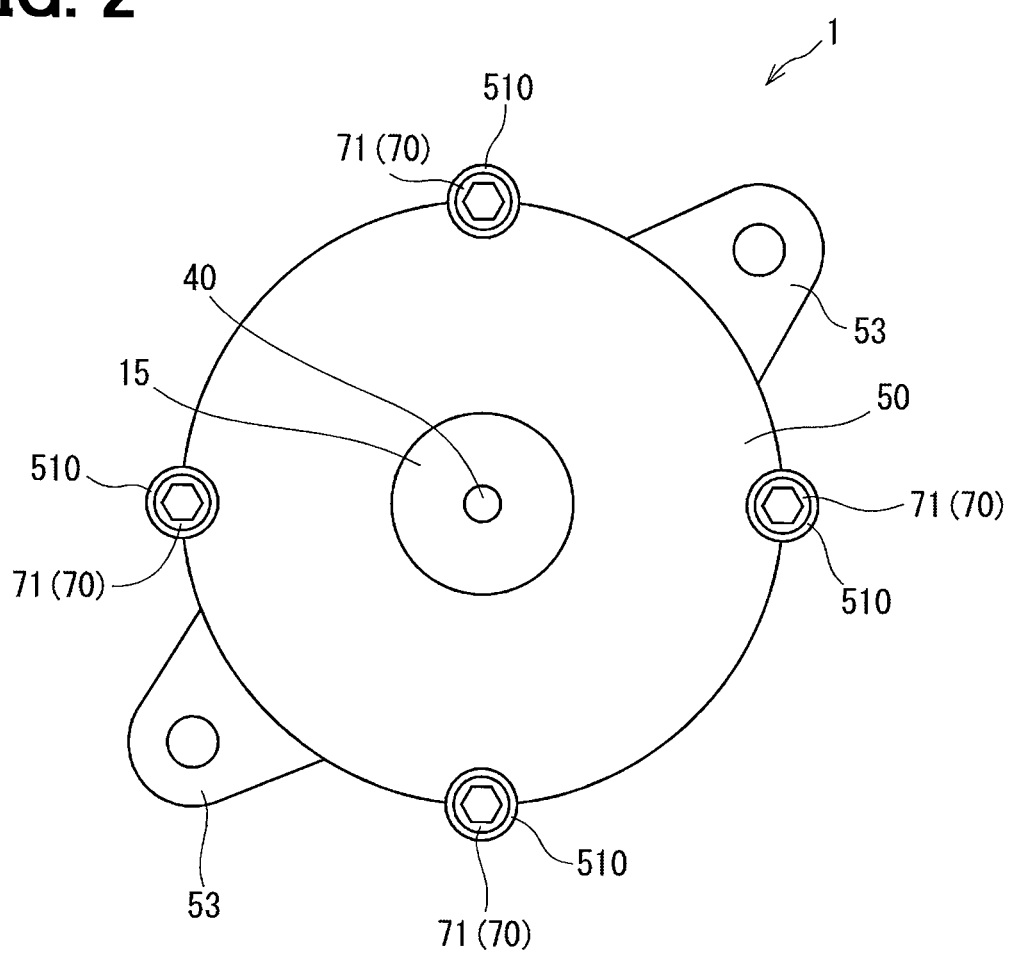
FIG. 2 is a schematic plan view showing a front side of the electric rotating machine when viewed in a direction II in FIG. 1.

A pair of flanged portions 53 is formed in the front-side end frame 50 in such a way that each flanged portion 53 is outwardly projected from the front-side bottom wall 52 in the radial direction, as shown in FIG. 2. The flanged portions 53 are fixed to the speed reduction device 5 by means of bolts (not shown).

The rear-side end frame 60 is formed in a cylindrical shape having a rear-side cylindrical wall 61, into which a rear-side end of the stator core 31 is fitted by the spigot joint, and a rear-side bottom wall 62, which closes a rear-side end of the cylindrical wall 61. The rear-side end frame 60 rotatably supports the rear-side axial end 42 (the first axial end) of the shaft 40 via a bearing 17 provided at a center of the rear-side bottom wall 62.

In the present embodiment, since each of the front-side and the rear-side end frames 50 and 60, which rotatably support the shaft 40, is fitted to the stator core 31 by the spigot joint in the axial direction, the shaft 40 is coaxially supported by the front-side and the rear-side end frames 50 and 60 with respect to the stator 30 with a high degree of accuracy.

The rear-side cylindrical wall 61 has multiple bolt-insertion portions 610 at such portions, each of which respectively coincides with each position of the bolt-insertion portions 510 of the front-side cylindrical wall 51 in the circumferential direction thereof. Each of the bolt-insertion portions 610 is formed at a radial-outward periphery of the rear-side cylindrical wall 61 in such a way that a part of the bolt-insertion portion 610 is outwardly projected therefrom in the radial direction. An internal thread 611 extending in the axial direction is formed in each of the bolt-insertion portions 610. In FIG. 1, a screw hole of the internal thread 611 is closed at the rear side of the rear-side end frame 60. However, a rear-side end of the screw hole may be opened.

The rear-side bottom wall 62 has a fixing portion 65, to which the control portion 80 is mounted.

The front-side and the rear-side end frames 50 and 60 are made by, for example, an aluminum die-casting method.

Each of the through-bolts 70 is composed of a head portion 71, the shaft portion 72 and a threaded portion 73. Each of the through-bolts 70 is inserted from the front side of the front-side end frame 50 into the respective through-hole 511. The shaft portion 72 and the threaded portion 73 of each through-bolt 70 pass through the through-hole 511 and the threaded portion 73 is screwed into the internal thread 611 of the rear-side end frame 60, so that the front-side and the rear-side end frames 50 and 60 are firmly connected to each other.

The control portion 80 is located at the rear side of the stator 30 and fixed to the fixing portion 65 of the rear-side bottom wall 62. The control portion 80 is composed of electronic components (not shown), such as, power modules, a micro-computer and so on, which constitutes an inverter circuit (not shown). The control portion 80 receives signals from various kinds of sensors and controls the electric power supply to the winding 32 of the motor portion 10 based on those signals. When the power supply to the winding 32 of the respective phases is sequentially changed, a rotating magnetic field is produced so that the rotor 20 is rotated together with the shaft 40.

A cover member 81 of a cup shape is fitted to a rear side of the rear-side end frame 60, so that the control portion 80 is accommodated in an inside space of the cover member 81.

A more detailed location for the respective portions will be explained with reference to FIG. 4.

Figure 4:
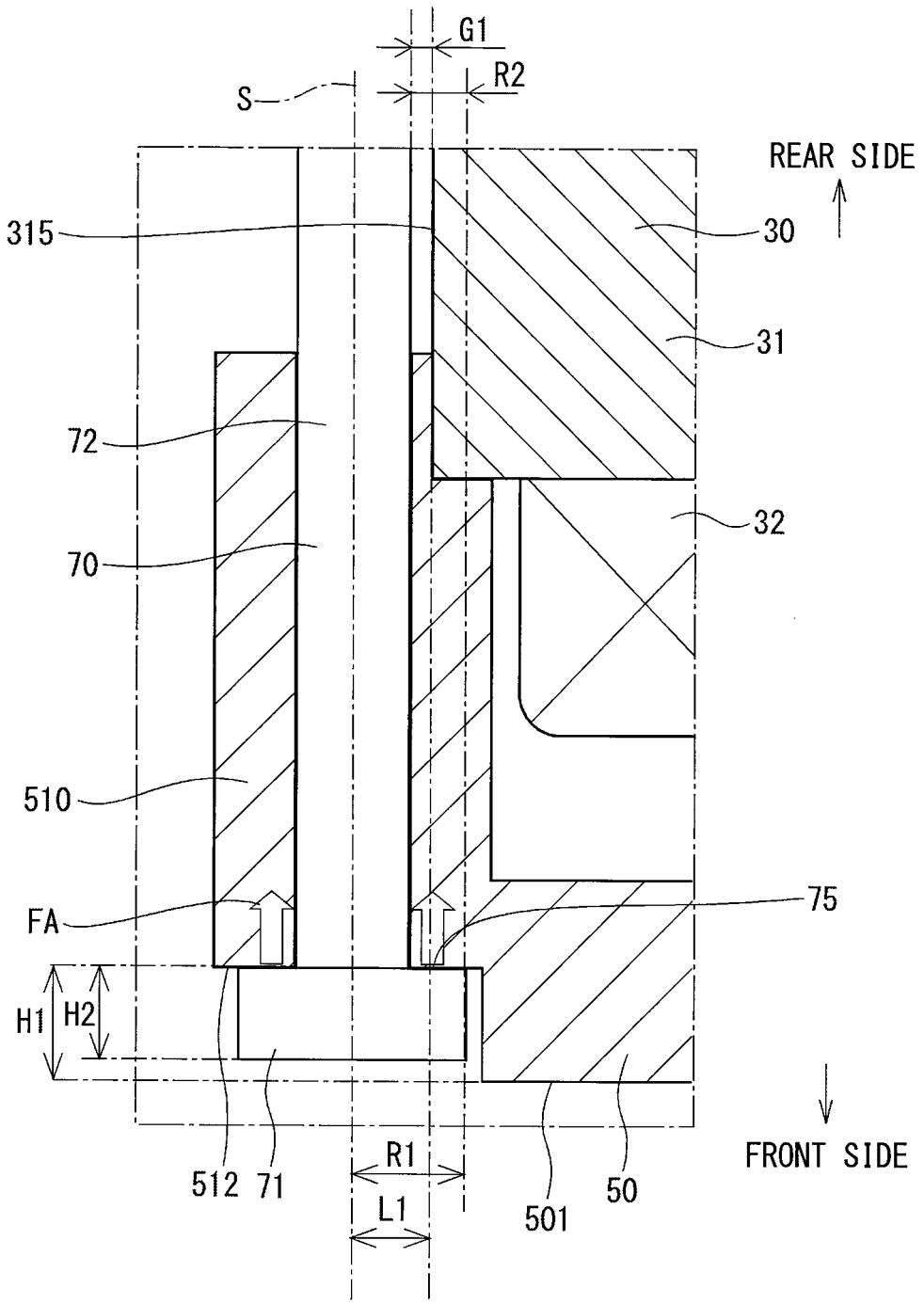
FIG. 4 is a schematic enlarged view showing a portion IV shown in FIG. 1.

In the present embodiment, as shown in FIG. 4, a distance "L1" between a shaft center "S" of the through-bolt 70 and a radial-outer peripheral surface 315 of the stator core 31 is smaller than a radius "R1" of the head portion 71 of the through-bolt 70. In other words, a gap "G1" between the through-bolt 70 and the stator core 31 is smaller than a distance "R2" of a seat surface portion 75 of the through-bolt 70. The distance "R2" is a radial length of the seat surface portion 75 of the head portion 71. According to the above structure, the head portion 71 of the through-bolt 70 and the stator core 31 partly overlap with each other in the radial direction, when viewed in the axial direction of the motor portion 10.

In addition, as shown in FIG. 4, the bolt-insertion portion 510 has a contacting surface 512, which is in contact with the seat surface portion 75 of the through-bolt 70. The contacting surface 512 is formed in the front-side end frame 50 at such a position, which is recessed from a front-side bottom surface 501 in the axial direction to the rear side of the motor portion 10. A height "H1" between the contacting surface 512 and the front-side bottom surface 501 is larger than a height "H2" of the head portion 71 of the through-bolt 70 in the axial direction. As a result, the head portion 71 of the through-bolt 70 is accommodated in a space formed between the contacting surface 512 and the front-side bottom surface 501. In the present disclosure, the above structure of the through-bolt 70 and the front-side end frame 50 is referred to as a pillow-head structure.

A problem of an electric rotating machine 100 of a prior art will be explained with reference to FIG. 8. The electric rotating machine 100 has an electric motor portion 110 (hereinafter, the motor portion 110) and an electric control portion 180 (hereinafter, the control portion 180) for controlling the motor portion 110. The motor portion 110 is composed of a rotor 120, a stator 130, a shaft 140, a front-side end frame 150, a rear-side end frame 160, multiple through-bolts 170 and so on. A diameter of the stator 130 is equal to or smaller than a diameter of a cover member 181 for the control portion 180.

Figure 8:
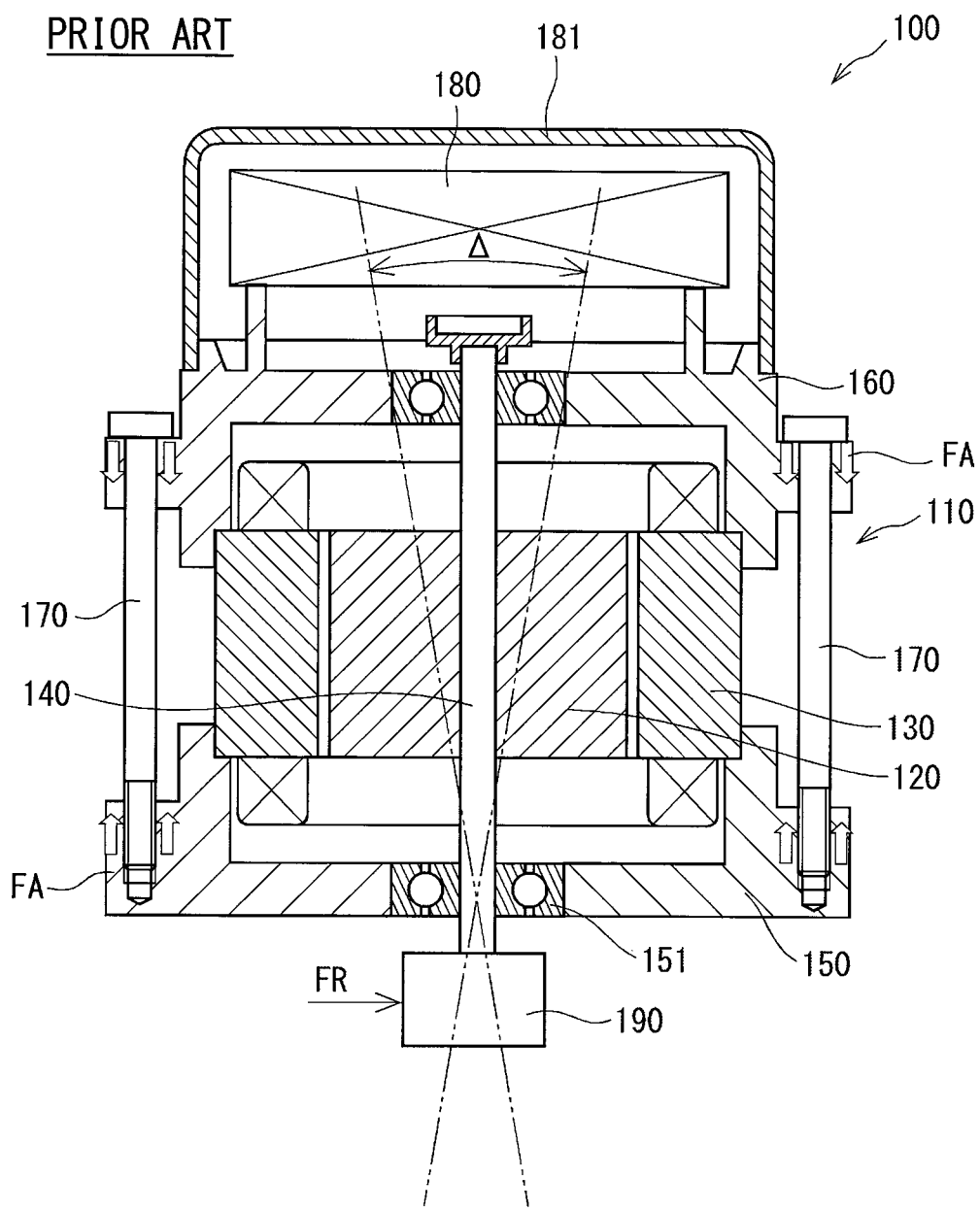
FIG. 8 is a schematic cross sectional view showing an electric rotating machine according a prior art.

In the electric rotating machine 100 of the prior art shown in FIG. 8, each of the through-bolts 170 is inserted into each of through-holes formed in the rear-side end frame 160 from a rear side of the electric rotating machine 100. Then, each forward end of the through-bolts 170 is screwed into a threaded portion formed in the front-side end frame 150, in order to firmly connect the rear-side end frame 160 to the front-side end frame 150. The control portion 180 as well as the cover member 181 for accommodating the control portion 180 is attached to the rear-side end frame 160. Therefore, each of the through-bolts 170 is located at a position, which is a radial-outward position of the cover member 181 in a radial direction of the electric rotating machine 100. In other words, it is difficult to locate the through-bolts 170 at such positions closer to the stator 130 in the radial direction. As a result, the axial force "FA" of each through-bolt 170 cannot be effectively applied to the stator 130 via the front-side and the rear-side end frames 150 and 160.

When the electric rotating machine 100 of the prior art is used as a power source for the electric power steering device, a reaction force, in particular, a radial force "FR" is applied to an output member 190, which is fixed to an axial end of the shaft 140, from a steering mechanism during a steering operation. When a function effect of the axial force "FA" by the through-bolts 170 applied to the stator 130 is small, a vibration in the radial direction may be generated in the shaft 140 with respect to a bearing 151 (working as a supporting point of the vibration) provided in the front-side end frame 150. As a result, an amount "A" of displacement of the shaft 140 (that is, an amount of displacement of the control portion 180) becomes larger at a location separated from a front-side bottom wall of the front-side end frame 150 in a direction to the rear side of the electric rotating machine 100, wherein the front-side bottom wall is fixed to the power steering device. Then, an amount of distortion of the control portion 180 correspondingly becomes larger.

In the electric rotating machine 100 of the prior art, the axial force "FA" of the through-bolts 170 is not effectively applied to the stator 130. Therefore, the front-side end frame 150 and the rear-side end frame 160 may be bent in a direction, in which each of the end frames is moved closer to each other. Then, such a bending movement of the rear-side end frame 160 may have an adverse influence on the control portion 180 fixed to the rear-side end frame 160.

Accordingly, a large mechanical stress may be applied to the control portion 180 in the electric rotating machine 100 of the prior art.

In a case that the through-bolts 170 were forcibly located at such positions closer to the stator 130 in the radial direction, it would become necessary to form through-holes in the cover member 181 for the purpose of assembling the through-bolts to the front-side and the rear-side end frames 150 and 160. However, such through-holes may cause a problem that extraneous material goes into the inside of the cover member 181. When sealing members are separately prepared and attached to the through-holes of the cover member 181 in order to avoid the above problem, then it would increase a manufacturing cost of the electric rotating machine.

Advantages of the Embodiment (1) In the electric rotating machine 1 of the present embodiment, the through-bolts 70 are inserted into the through-holes 511 formed in the front-side end frame 50 from the front side of the electric rotating machine 1 (from the side of the front-side end frame 50) and the front-side end frame 50 is connected to the rear-side end frame 60. According to the above structure, the locations for the through-bolts 70 are not restricted by the space for mounting the control portion 80 and the cover member 81 (accommodating the control portion 80) to the rear-side end frame 60. Therefore, it is possible to locate the through-bolts 70 at the positions closer to the stator 30 in the radial direction. The axial force of the through-bolts 70 can be effectively applied to the stator 30 and the front-side end frame 50 can be firmly connected to the rear-side end frame 60. As a result, even when the radial force "FR" is applied from the steering mechanism to the electric rotating machine 1, it is possible to prevent the vibration of the rear-side end frame 60.

In addition, since the axial force "FA" of the through-bolts 70 is effectively applied to the stator 30 via the front-side and the rear-side end frames 50 and 60, it is possible to prevent the front-side and/or the rear-side end frame 50 and 60 from being bent by the axial force "FA" of the through-bolts 70.

As above, in the present embodiment, it is possible to suppress the mechanical stress which may be applied to the control portion 80.

(2) In the electric rotating machine 1 of the present embodiment, in which the diameter of the stator 30 is smaller than that of the cover member 81 for the control portion 80, the through-bolts 70 are located at the positions closer to the stator 30 in the radial direction, so that the positions of the through-bolts 70 overlap with the space covered by the cover member 81 when viewed in the axial direction of the electric rotating machine 1.

According to the above structure, since the through-bolts 70 are inserted into the through-holes 511 of the front-side end frame 50 from the front side of the electric rotating machine 1, it is possible to locate the through-bolts 70 at the positions closer to the stator 30 without forming the extra through-holes in the cover member 81. Therefore, the extraneous material may not enter the inside of the cover member 81, in which the control portion 80 is accommodated. In addition, it is possible to carry out an assembling process for the through-bolts 70 by use of a socket wrench and/or any other tools without being disturbed by any part of the cover member 81.

(3) In the present embodiment, the distance "L1" between the shaft center "S" of the through-bolt 70 and the radial-outer peripheral surface 315 of the stator core 31 is smaller than the radius "R1" of the head portion 71 of the through-bolt 70. According to the above structure, the axial force "FA" of the through-bolt 70 is effectively applied to the stator core 31 in the axial direction thereof via the front-side and the rear-side end frames 50 and 60. It is, therefore, possible not only to firmly connect the front-side and the rear-side end frames 50 and 60 to each other, wherein the stator 30 is held between them, but also to prevent the possible bending of the front-side and/or the rear-side end frames 50 and/or 60.

(4) In the electric rotating machine of the prior art, which is used for the electric power steering device, the coils for the stator core are wound by a concentrated winding method. On the other hand, in the embodiment of the present disclosure, the coils (the winding 32) for the stator core 31 are wound by the full-pitch distributed-winding method. Accordingly, noise generated by the electric rotating machine 1 of the present embodiment can be reduced when compared with that of the electric rotating machine of the prior art.

(5) In the concentrated winding method, the coil of the respective phase is generally wound on one tooth portion. On the other hand, in the distributed winding method, the coil of the respective phase is wound on the multiple tooth portions. Therefore, in the case of the distributed winding method, the width of the tooth portion in the circumferential direction becomes smaller than that of the case of the concentrated winding method. More exactly, in the electric rotating machine of the prior art, in which the coil is wound by the concentrated winding method, the width of the tooth portion is larger than a diameter of a shaft portion of the through-bolt. However, in the present embodiment, in which the coil is wound by the full-pitch distributed winding method, the width "W" of the tooth portion 311 at its root portion in the circumferential direction is smaller than the diameter "D" of the shaft portion 72 of the through-bolt 70, as shown in FIG. 3.

It could be possible to locate the through-bolts 70 at such positions, at which a part or a full portion of each shaft portion 72 of the through-bolt 70 cuts into the yoke portion 312, only for the purpose of achieving that the axial force of the through-bolts would be applied to the stator core 31. However, it is necessary in reality to take it into consideration that the yoke portion 312 is not magnetically saturated. When the yoke portion 312 is magnetically saturated, a torque of the motor portion 10 will be decreased and/or vibration of the electric rotating machine will be increased.

In a case that the width "W" of the tooth portion 311 was larger than the diameter "D" of the shaft portion 72 of the through-bolt 70, a required space for the magnetic flux could be secured in the yoke portion 312, even when the through-bolts were located at such positions at which the shaft portion 72 is opposed to the tooth portion 311 in the radial direction and a part or a full portion of the shaft portion 72 cuts into the yoke portion 312. In such a case, the yoke portion 312 would not be magnetically saturated.

However, in the case that the width "W" of the tooth portion 311 is smaller than the diameter "D" of the shaft portion 72 of the through-bolt 70, like the present embodiment, the yoke portion 312 runs short of the space for the magnetic flux, even when the through-bolts 70 are located at such positions at which each of the shaft portions 72 is opposed to the tooth portion 311 in the radial direction and a part or a full portion of the shaft portion 72 cuts into the yoke portion 312. Therefore, the yoke portion 312 may be magnetically saturated.

It is possible to make a thickness of the yoke portion 312 larger in order to secure the necessary space for the magnetic flux. However, it may cause another problem that a size of the stator core 31 is increased.

As a result that the above situation is taken into consideration in the present embodiment, the through-bolts 70 are located at such positions, at which the shaft portion 72 of each through-bolt 70 does not cut into the yoke portion 312 of the stator core 31.

Therefore, according to the present embodiment, it is possible that the axial force of the through-bolts 70 can be effectively applied to the stator core 31 by the arrangement explained above in the paragraph (1).

In other words, according to the present embodiment, although the coil is wound by the full-pitch distributed-winding method and thereby the width "W" of the tooth portion 311 is smaller than the diameter "D" of the shaft portion 72 of the through-bolt 70, it is possible that the axial force of the through-bolts 70 can be effectively applied to the stator core 31 via the front-side and the rear-side end frames 50 and 60 without increasing the size of the stator core 31.

(6) In the present embodiment, the stator core 31 has twelve tooth portions 311 for each pair of the magnetic poles. According to the above structure, it is possible that the electric rotating machine 1 can properly produce a torque required for the electric power steering device 101.

(7) In the present embodiment, the through-bolt 70 and the front-side end frame 50 are formed in the pillow-head structure. Namely, the bolt-insertion portion 510 is recessed in the axial direction toward the stator 30, so that the head portion 71 of the through-bolt 70 is accommodated in the space formed in the radial direction between the contacting surface 512 of the bolt-insertion portion 510 and the front-side bottom surface 501 of the front-side end frame 50. In other words, a top surface of the head portion 71 steps back from the front-side bottom surface 501 of the front-side end frame 50 in the axial direction to the rear-side end frame 60. It is, therefore, possible to prevent the head portion 71 of the through-bolt 70 from interfering with any portion of an installation part of the vehicle body (for example, the fixing portion 5 of the vehicle body), to which the electric rotating machine is fixed.

Second Embodiment

An electric rotating machine 2 of a second embodiment of the present disclosure will be explained with reference to FIGS. 5 and 6.

The second embodiment is different from the first embodiment in that a cylindrical supporting member 35 is provided at an outer peripheral side of the stator 30 and the electric rotating machine 2 has a water-proof structure. Hereinafter, those portions which are different from the first embodiment will be explained.

Figure 5:
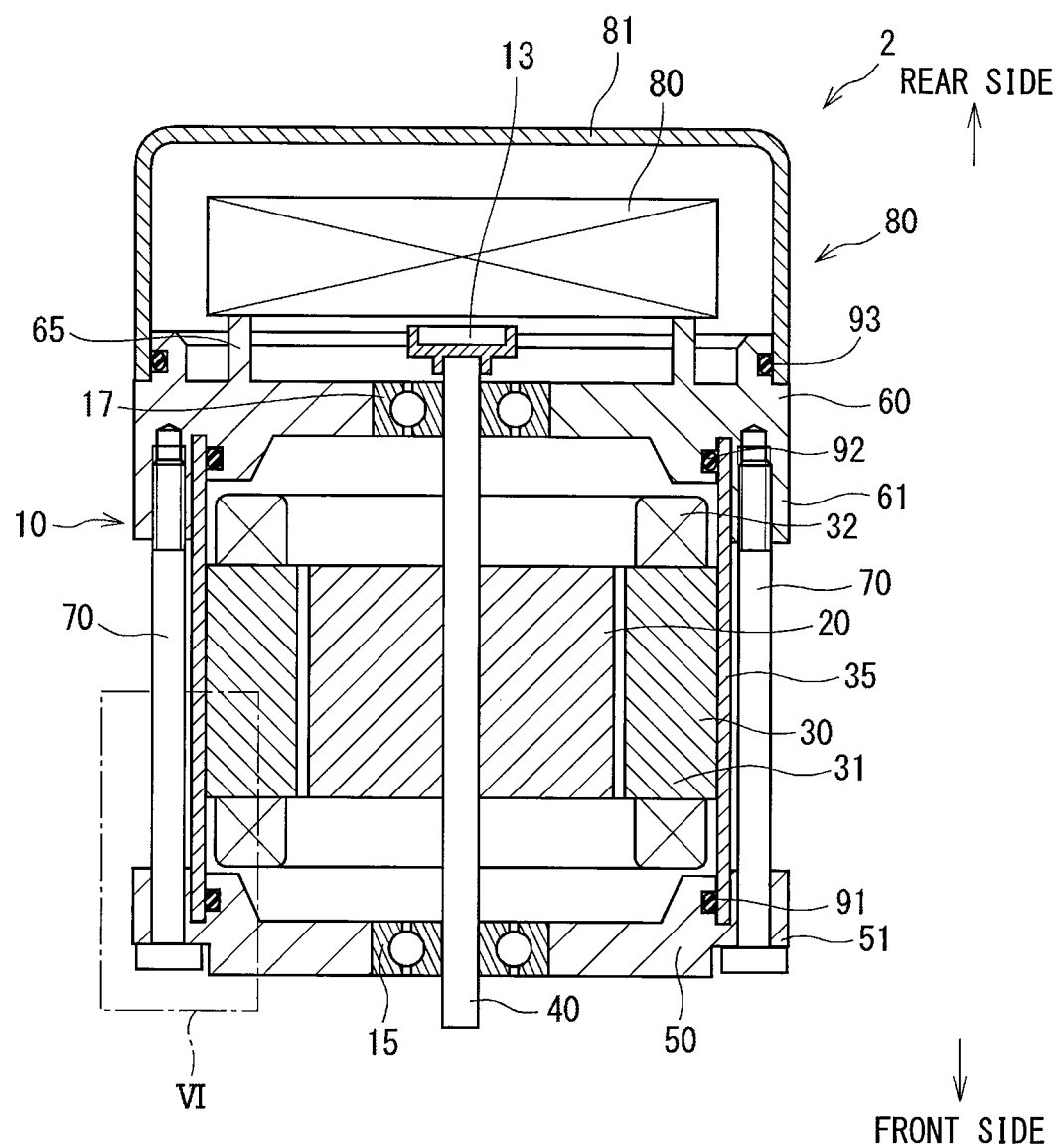
FIG. 5 is a schematic cross sectional view showing an electric rotating machine according to a second embodiment of the present disclosure.
Figure 6:
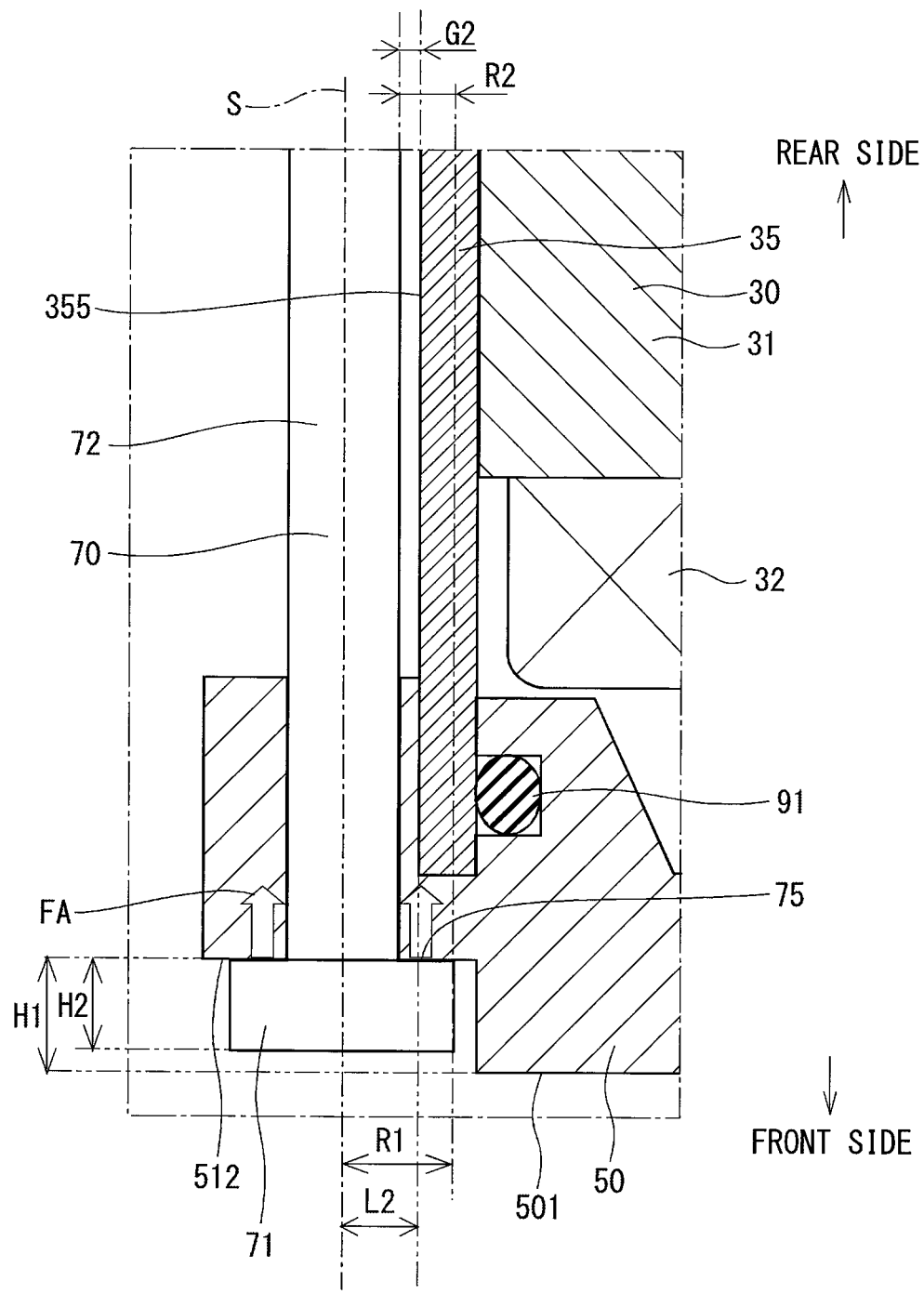
FIG. 6 is a schematic enlarged view showing a portion VI shown in FIG. 5.

As shown in FIG. 5, the stator core 31 is fixed to an inner peripheral wall of the cylindrical supporting member 35. The front-side cylindrical wall 51 of the front-side end frame 50 is fitted to a front-side end of the cylindrical supporting member 35 by the spigot joint. The rear-side cylindrical wall 61 of the rear-side end frame 60 is likewise fitted to a rear-side end of the cylindrical supporting member 35 by the spigot joint.

In the present embodiment, therefore, the front-side and the rear-side end frames 50 and 60 hold the cylindrical supporting member 35 in the axial direction between them, wherein the stator core 31 is fixedly supported by the cylindrical supporting member 35 at its inside. According to the above structure, it is possible to easily and surely hold the stator core 31 between the front-side and the rear-side end frames, even when the stator core 31 is formed by a laminated structure and its rigidity is relatively low. The cylindrical supporting member 35 is made of, for example, metal.

In addition, a sealing member 91 is arranged between the front-side end frame 50 and the front-side end of the cylindrical supporting member 35, while another sealing member 92 is arranged between the rear-side end frame 60 and the rear-side end of the cylindrical supporting member 35. The sealing members 91 and 92 are collectively referred to as a second sealing member.

A further sealing member 93 is arranged between the rear-side end frame 60 and the cover member 81 for the control portion 80. The sealing member 93 is also referred to as a first sealing member.

Each of the sealing members 91 to 93 fluid-tightly seals a gap and/or space formed between the cover member 81 and the rear-side end frame 60 and between the cylindrical supporting member 35 and the front-side and/or the rear-side end frames 60 and 50.

The motor portion 10 and the control portion 80 of the electric rotating machine 2 are formed in the water-proof structure by the sealing members 91 to 93. It is, therefore, possible to prevent water from going into the electric rotating machine 2, even in a case that the electric rotating machine 2 is provided at a position neighboring to the rack shaft 7.

The location of the through-bolt 70 will be further explained with reference to FIG. 6.

In the present embodiment, a distance "L2" between the shaft center "S" of the through-bolt 70 and a radial-outer peripheral surface 355 of the cylindrical supporting member 35 is smaller than the radius "R1" of the head portion 71 of the through-bolt 70. In other words, the through-bolt 70 is located at such position that a gap "G2" between the through-bolt 70 and the cylindrical supporting member 35 becomes smaller than the distance "R2" of the seat surface portion 75 of the through-bolt 70. According to the above structure, the head portion 71 of the through-bolt 70 and the cylindrical supporting member 35 partly overlap with each other in the radial direction, when viewed in the axial direction of the motor portion 10.

According to the above structure of the present embodiment, the axial force of the through-bolts 70 is effectively applied, via the front-side and the rear-side end frames 50 and 60, in the axial direction of the stator 30 to the cylindrical supporting member 35, which supports the stator core 31 of the stator 30 at its inner periphery. The through-bolts 70 firmly connect the front-side end frame 50 and the rear-side end frame 60, which support the cylindrical supporting member 35 between them. In addition, it is possible to prevent the front-side and/or the rear-side end frame 50 and 60 from being bent by the axial force of the through-bolts 70. Accordingly, in the same manner to the first embodiment, it is possible to suppress the mechanical stress which may be applied to the control portion 80.

Third Embodiment

An electric rotating machine 3 of a third embodiment of the present disclosure will be explained with reference to FIG. 7.

The third embodiment is different from the second embodiment in that a supporting member 36 for fixedly supporting the stator 30 at its inner peripheral surface has a different shape (a cup shape). Hereinafter, those portions which are different from the second embodiment will be explained.

Figure 7:
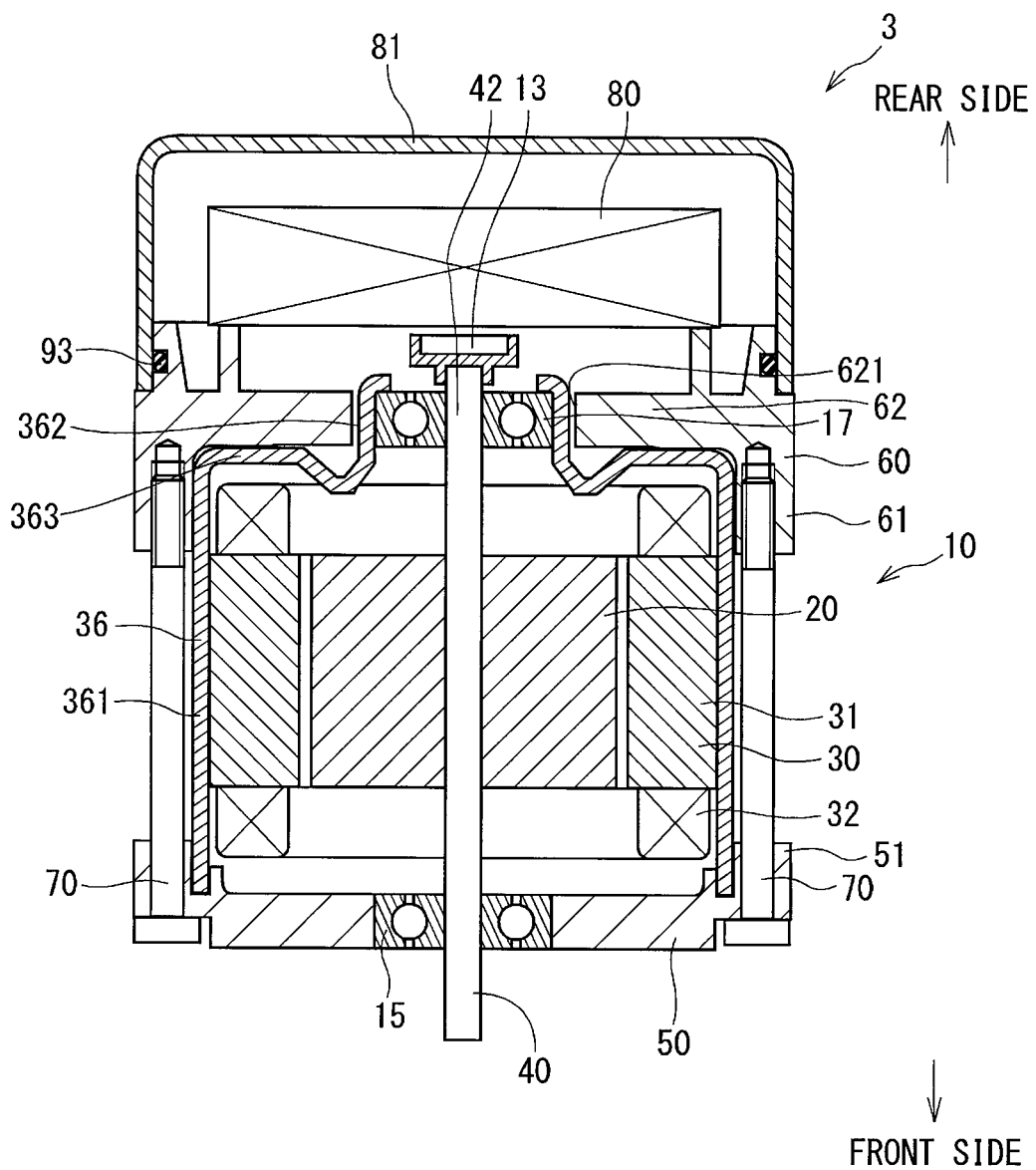
FIG. 7 is a schematic cross sectional view showing an electric rotating machine according to a third embodiment of the present disclosure.

As shown in FIG. 7, the cup-shaped supporting member 36 of the third embodiment has a first cylindrical portion 361 for supporting the stator core 31 at the inside thereof, a second cylindrical portion 362 formed at a rear side of the first cylindrical portion 361 and having a smaller diameter than that of the first cylindrical portion 361, and a bottom wall portion 363 formed between the first and the second cylindrical portions 361 and 362. The supporting member 36 is made of, for example, metal.

The front-side cylindrical portion 51 of the front-side end frame 50 is fitted to a front-side end of the first cylindrical portion 361 of the supporting member 36 by the spigot joint. The rear-side cylindrical portion 61 as well as the rear-side bottom wall 62 of the rear-side end frame 60 is in contact with the bottom wall portion 363 of the supporting member 36 on a rear side of the supporting member 36. According to the above structure, the supporting member 36 for fixedly supporting the stator core 31 is firmly held between the front-side and the rear-side end frames 50 and 60.

The second cylindrical portion 362 is arranged at an inside of a shaft-insertion hole 621 formed in the rear-side bottom wall 62. In other words, in the third embodiment, the supporting member 36 supports the rear-side axial end 42 of the shaft 40 via the bearing 17.

In the second embodiment (FIGS. 5 and 6), it is necessary to coaxially position the bearing 15 formed in the front-side end frame 50, the bearing 17 formed in the rear-side end frame 60 and the cylindrical supporting member 35 to one another. However, in the third embodiment, it is not necessary to coaxially position the bearing 17, because the bearing 17 is fixed to the supporting member 36. According to the above structure, it is possible in the third embodiment not only to obtain the same advantages to the second embodiment but also to simplify a manufacturing process of the electric rotating machine 3.

In the present embodiment, the second sealing member (the sealing member corresponding to the sealing members 91 and 92 of the second embodiment) is not provided in the motor portion 10. Only the sealing member 93 (the first sealing member) is provided in the control portion 80.

Further Embodiments and/or Modifications (M1) In the above embodiments, the through-bolts 70 are inserted through the through-holes 511 of the front-side end frame 50 from the front side of the electric rotating machine, so that it becomes possible to locate the through-bolts 70 at such positions closer to the stator 30 or the supporting member 35 or 36 in the radial direction of the electric rotating machine. However, the locations of the through-bolts are not limited to those of the above embodiments.

For example, it is not always necessary to locate the through-bolts at the positions, at which the through-bolts 70 and the stator 30 or the through-bolts 70 and the supporting member 35 or 36 overlap with each other in the radial direction when viewed in the axial direction of the electric rotating machine.

(M2) The coil for the winding 32 of the stator core 31 may be made by the concentrated winding method. The width "W" of the tooth portion 311 may be made to become larger than the diameter "D" of the through-bolt 70. In such a case, the through-bolts 70 maybe located at the positions, at which each of the through-bolts 70 cuts into the yoke portion 312. In addition, the number of the tooth portions 311 for each pair of the magnetic poles is not limited to twelve.

(M3) The front-side end frame 50 and the through-bolts 70 may not be always formed in the pillow-head structure. In other words, a part or a full of the head portion 71 of the through-bolt 70 may be outwardly projected in the axial direction from the front-side bottom surface 501 of the front-side end frame 50.

The present disclosure is not limited to the above embodiments and modifications, but can be further modified in various manners without departing from a spirit of the present disclosure. In addition, the above embodiments and/or the modifications can be combined to each other.

What is claimed is:

1. An electric rotating machine, which is applied to an electric power steering device of a vehicle and which is mounted to a fixing portion of the vehicle, comprising:
   an electric motor portion having;

i) a stator having a cylindrical stator core and a winding wound on the stator core or a supporting member fixedly supporting the stator at its inside; and
ii) a rotor rotatably provided inside of the stator;
a control portion for controlling power supply to the winding of the electric motor portion;
a first end frame provided at a first axial end of the stator, wherein the control portion is mounted to a rear side of the first end frame opposite to the stator;
a second end frame provided at a second axial end of the stator and fixed to the fixing portion of the vehicle, wherein the first end frame and the second end frame hold between them the stator or the supporting member in an axial direction of the electric rotating machine;
multiple through-holes formed at a radial-outer periphery of the second end frame; and
multiple through-bolts, each of which is inserted through each through-hole and screwed into the first end frame in order to firmly connect the first and the second end frames to each other, wherein each of the through-bolts is assembled to the first and the second end frames from an axial end side of the second end frame.

2. The electric rotating machine according to claim 1, wherein
a distance between a shaft center of the through-bolt and a radial-outer peripheral surface of the stator core or the supporting member in a radial direction of the electric rotating machine is smaller than a radius of a head portion of the through-bolt.

3. The electric rotating machine according to claim 1, wherein
the stator core has multiple tooth portions, each of which extends in a radial-inward direction of the stator, and
a width of the tooth portion at its root in a circumferential direction of the stator is smaller than a diameter of a shaft portion of the through-bolt.

4. The electric rotating machine according to claim 3, wherein
the winding of the stator is wound on the tooth portions by a full-pitch distributed-winding method.

5. The electric rotating machine according to claim 4, wherein
the stator core has twelve tooth portions for each pair of magnetic poles.

6. The electric rotating machine according to claim 1, wherein
a contacting surface of the second end frame, which is in contact with a seat surface portion of a head portion of the through-bolt, is recessed from a front-side bottom surface of the second end frame in the axial direction toward the stator, and
a height between the contacting surface and the front-side bottom surface in the axial direction is larger than a height of the head portion of the through-bolt.

7. The electric rotating machine according to claim 1, further comprising;
a cover member fixed to the first end frame and accommodating the control portion therein; and
a first sealing member provided between the cover member and the first end frame for fluid-tightly sealing a space between them.

8. The electric rotating machine according to claim 7, wherein
the cylindrical supporting member is fitted to each of the first and the second end frames at each axial end of the cylindrical supporting member,
second sealing members are respectively provided between the cylindrical supporting member and the first end frame and between the cylindrical supporting member and the second end frame, for fluid-tightly sealing each space between them.

9. An electric rotating machine, which is applied to an electric power steering device of a vehicle and which is mounted to a predetermined fixing portion of the vehicle, comprising:
a stator having a cylindrical stator core and a winding wound on the stator core;
a rotor rotatably provided inside of the stator;
a control portion for controlling power supply to the winding of the stator;
a first end frame provided at a first axial end of the stator, wherein the control portion is fixed to a rear side of the first end frame so that the first end frame is arranged between the stator and the control portion;
a second end frame provided at a second axial end of the stator and fixed to the fixing portion of the vehicle, wherein the first end frame and the second end frame hold the stator between them in an axial direction of the electric rotating machine;
multiple through-holes formed at a radial-outward periphery of the second end frame; and
multiple through-bolts, each of which is inserted through each of the through-holes and screwed into the first end frame in order to firmly connect the first and the second end frames to each other,
wherein a distance between a shaft center of the through-bolt and a radial-outer peripheral surface of the stator core in a radial direction of the electric rotating machine is smaller than a radius of a head portion of the through-bolt.

10. An electric rotating machine, which is applied to an electric power steering device of a vehicle and which is mounted to a predetermined fixing portion of the vehicle, comprising:
a stator having a cylindrical stator core and a winding wound on the stator core;
a cylindrical supporting member for fixedly supporting the stator at an inside of the cylindrical supporting member;
a rotor rotatably provided inside of the stator;
a control portion provided for controlling power supply to the winding of the stator;
a first end frame provided at a first axial end of the stator, wherein the control portion is fixed to a rear side of the first end frame so that the first end frame is arranged between the stator and the control portion;
a second end frame provided at a second axial end of the stator and fixed to the fixing portion of the vehicle, wherein the first end frame and the second end frame hold the cylindrical supporting member between them in an axial direction of the electric rotating machine;
multiple through-holes formed at a radial-outward periphery of the second end frame; and
multiple through-bolts, each of which is inserted through each of the through-holes and screwed into the first end frame in order to firmly connect the first and the second end frames to each other.
wherein a distance between a shaft center of the through-bolt and a radial-outer peripheral surface of the cylindrical supporting member in a radial direction of the electric rotating machine is smaller than a radius of a head portion of the through-bolt.

11. An electric rotating machine, which is applied to an electric power steering device of a vehicle and which is mounted to a predetermined fixing portion of the vehicle, comprising:
- a stator having a cylindrical stator core and a winding wound on the stator core;
- a cup-shaped supporting member having; a first cylindrical portion for fixedly supporting the stator at an inside of the first cylindrical portion; and a second cylindrical portion for fixedly supporting a first bearing;
- a rotor having a rotating shaft and rotatably provided inside of the stator;
- a control portion provided for controlling power supply to the winding of the stator;
- a first end frame provided at a first axial end of the stator, wherein the control portion is fixed to a rear side of the first end frame so that the first end frame is arranged between the stator and the control portion;
- a second end frame provided at a second axial end of the stator and fixed to the fixing portion of the vehicle, wherein the first end frame and the second end frame hold the cup-shaped supporting member between them in an axial direction of the electric rotating machine, wherein the second end frame firmly supporting a second bearing so that the rotating shaft of the rotor is rotatably supported by the first and the second bearings;

multiple through-holes formed at a radial-outward periphery of the second end frame; and multiple through-bolts, each of which is inserted through each of the through-holes and screwed into the first end frame in order to firmly connect the first and the second end frames to each other, wherein a distance between a shaft center of the through-bolt and a radial-outer peripheral surface of the cup-shaped supporting member in a radial direction of the electric rotating machine is smaller than a radius of a head portion of the through-bolt.

* * * * *